United States Patent
Ghanma

(10) Patent No.: US 10,469,985 B2
(45) Date of Patent: Nov. 5, 2019

(54) SYSTEM AND USE METHOD FOR BROADCASTING SPECIFIC DATA CONTENT TO SPECIFIC USERS BASED ON MESSAGE LIFETIME

(71) Applicant: Tariq Tony Ghanma, Santa Clara, CA (US)

(72) Inventor: Tariq Tony Ghanma, Santa Clara, CA (US)

(*) Notice: Subject to any disclaimer, the term of this patent is extended or adjusted under 35 U.S.C. 154(b) by 0 days.

(21) Appl. No.: 16/048,248

(22) Filed: Jul. 28, 2018

(65) Prior Publication Data

US 2019/0045322 A1 Feb. 7, 2019

Related U.S. Application Data

(60) Provisional application No. 62/541,340, filed on Aug. 4, 2017.

(51) Int. Cl.
| | |
|---|---|
| *H04W 4/02* | (2018.01) |
| *H04W 4/021* | (2018.01) |
| *H04W 4/029* | (2018.01) |
| *H04W 4/06* | (2009.01) |
| *H04W 4/23* | (2018.01) |
| *H04W 4/12* | (2009.01) |

(52) U.S. Cl.
CPC ......... *H04W 4/021* (2013.01); *H04W 4/027* (2013.01); *H04W 4/029* (2018.02); *H04W 4/06* (2013.01); *H04W 4/12* (2013.01); *H04W 4/23* (2018.02)

(58) Field of Classification Search
CPC .................................................. H04W 4/021
See application file for complete search history.

(56) References Cited

U.S. PATENT DOCUMENTS

| | | | |
|---|---|---|---|
| 7,657,253 B2 | 2/2010 | Lewis | |
| 7,877,454 B1 | 1/2011 | Hunter | |
| 2004/0249900 A1 | 12/2004 | Karstens | |
| 2012/0284093 A1* | 11/2012 | Evans | H04W 4/21 705/14.1 |
| 2015/0256276 A1* | 9/2015 | Jones | H04H 20/59 455/3.01 |
| 2015/0334061 A1 | 11/2015 | Baird | |
| 2016/0117724 A1* | 4/2016 | Tseng | G06Q 30/0251 705/14.49 |
| 2016/0164816 A1* | 6/2016 | Bhagwan | H04L 51/18 709/206 |
| 2016/0196742 A1* | 7/2016 | Liu | G08G 1/0125 701/118 |

* cited by examiner

*Primary Examiner* — Michael T Vu
(74) *Attorney, Agent, or Firm* — Robert Brownstein

(57) ABSTRACT

The invention is a system and use method for enabling a broadcaster user to specify a message lifetime, compose messages to be broadcast to recipient users located in geographical areas determined by message lifetime and recipient users' locations, directions and speeds; and to broadcast messages to recipient users who have entered or are in those geographical areas.

2 Claims, 4 Drawing Sheets

SYSTEM AND USE METHOD FOR BROADCASTING SPECIFIC DATA CONTENT TO SPECIFIC USERS BASED ON MESSAGE LIFETIME

TECHNICAL FIELD

System and use method using mobile devices, vehicular navigation systems and servers to control area coverage of specific messages to specific users.

BACKGROUND OF THE INVENTION

Wireless dissemination of data packets has become ubiquitous. Billions of bits of data and the messages they represent are dispensed wirelessly every hour of every day. Such wireless packets are sent containing headers that contain origination and destination nodal addresses. But senders are unaware of the physical locations of those message recipients. If there was a way to target specific messages, at specific recipients, in specific geographical areas, based on message lifetime, it would enable nearly limitless possibilities for security alerts, operational controls, commercial interactions and the like.

BRIEF SUMMARY OF THE INVENTION

Making use of handheld devices, computing devices, vehicular navigation systems, servers, and programmatic underpinnings, the system and use methods herein disclosed and claimed enable the broadcasting of specific data content, to specific recipients, in specific geographical areas based on message lifetime. A user referred to as a "broadcaster," using a computing device and underlying program is able to establish a message lifetime and compose messages to be sent as wireless data packets to users referred to as "recipients," who have opted in to receive such messages on their handheld devices equipped with wireless communications capabilities and GPS navigational receivers. When a recipient is within a geo-fence area, as determined by a server based on a broadcaster's message lifetime and a recipient's location, direction and speed, the server will dispatch a message to such recipients having determined that they can respond to the message received within that message's lifetime. If the user has opted to receive messages from the broadcaster, the recipient's navigation system will receive one or more messages. Later, when the recipient's vehicle arrives at a message-based destination, the message automatically transfers to the recipient's hand-held mobile device. For example, if the message were a discount offering of some kind, the recipient can exit the vehicle and proceed on foot to an offer redemption location. The offer would then be on the mobile device and can be redeemed.

Whereas the handheld devices, vehicular navigation systems, servers and wireless communications infrastructure are all standard subsystems of the invention, the underlying program or programs in conjunction with the subsystem hardware makes it possible to broadcast messages to a limited base of users in a specifically defined geo-fence area, based on message lifetime.

BRIEF DESCRIPTIONS OF THE DRAWINGS

DETAILED DESCRIPTION OF THE INVENTION

The invention herein disclosed and claimed makes use of native capabilities of handheld devices, computing devices, vehicular navigation systems, and cloud servers, in conjunction with underlying program or programs. The system enables a broadcaster to establish a message lifetime, compose messages intended for recipients located within a geographical area based on that message lifetime and recipients' location, direction and speed; and convey those messages wirelessly to those recipients.

The system herein disclosed and claimed comprises one or more handheld devices, one of more vehicular navigation systems and APIs, one or more computing systems, one or more cloud servers, wireless conveyance infrastructure, and underlying program or programs shared by cloud servers, vehicular navigation systems and handheld devices.

Figure 1:
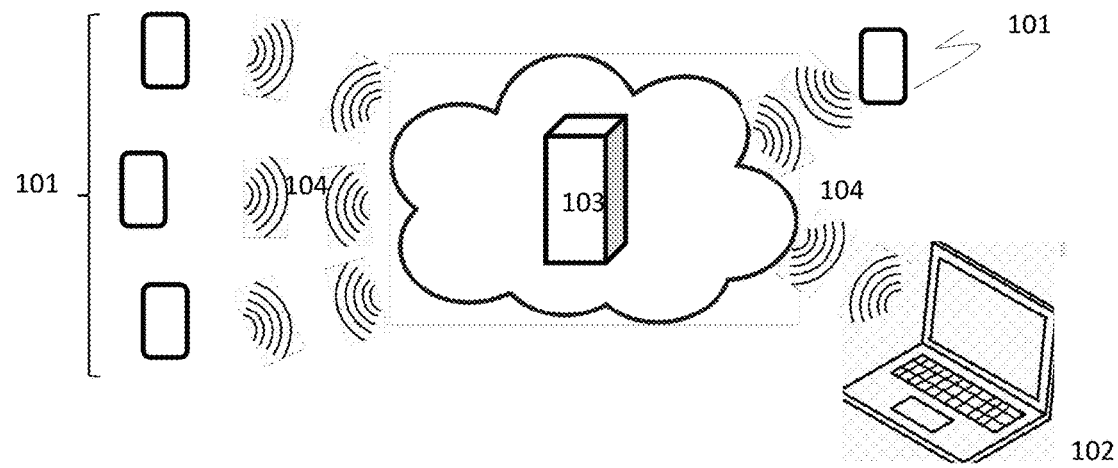
FIG. 1 depicts a system comprising one or more mobile devices, one or more cloud servers, and wireless conveyance of data packets.

As shown in FIG. 1, an exemplary system comprises one or more handheld devices (101), one or more computing devices (102), one or more cloud servers (103) and infrastructure supporting wireless conveyance of messages comprising one or more data packets (104). The handheld devices and cloud server or servers are underpinned by a program or programs organized in a conventional client-server model (not shown).

Figure 2:
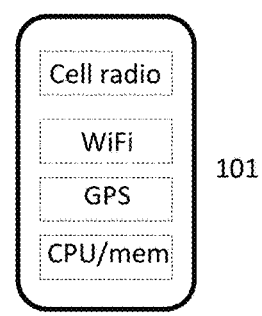
FIG. 2 illustrates an exemplary handheld device comprising cellular wireless subsystem, WiFi wireless subsystem, GPS receiver, and CPU and memory subsystems.

As shown in FIG. 2, exemplary handheld devices, such as smartphones, comprise cellular wireless and WiFi wireless subsystems, a GPS subsystem, and computing subsystem comprising a CPU, program memory and storage (101).

Figure 3:
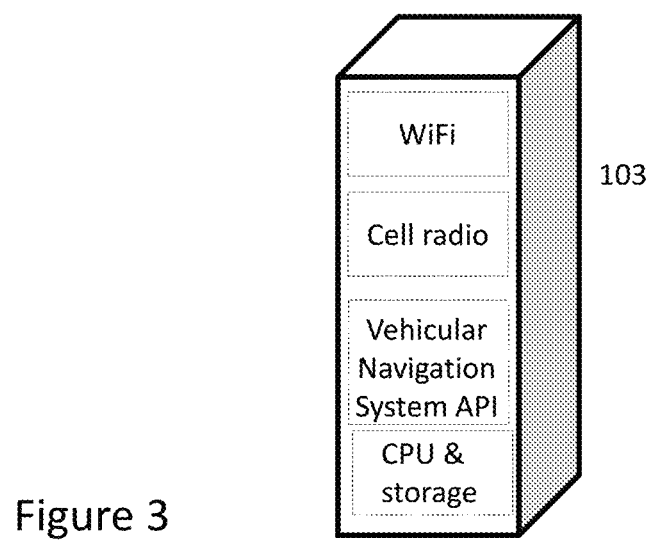
FIG. 3 illustrates an exemplary server comprising WiFi wireless subsystem, cellular wireless subsystem, vehicular navigation system application program interface, and CPU and storage subsystems.

FIG. 3 depicts an exemplary server comprising a computing subsystem with CPU, program memory and storage, a cellular wireless subsystem, a vehicular navigation system API, and WiFi wireless subsystem.

A program or programs residing both in the handheld devices and the cloud server or servers (not shown) enables the following capabilities in conjunction with the hardware subsystems.

Figure 4:
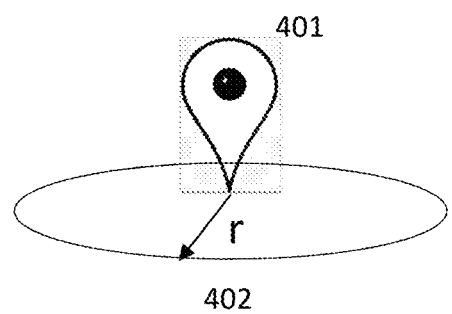
FIG. 4 illustrates that the system can establish a center point and area, based on message lifetime input data, which will constitute a geo-fence area.

FIG. 4 illustrates the invention system can establish a center (401) and area (402) based upon message lifetime limits, redemption location position, and recipient users' location, direction and speed. The area, 402, is a dynamic geo-fence area within which recipients may receive messages having a finite lifetime associated with them. For example, starting with a redemption location position as the center, a dynamic circular area is established by determining a radius value based on message lifetime and a recipient's location, direction and speed values. The center comprises a latitude and longitude coordinate pair. The dynamic circular area will contain a set of latitude and longitude coordinate pairs based on its circumference. When a recipient's device (mobile or handheld) conveys GPS latitude and longitude coordinates that fall within that dynamic circle area, the finite lifetime message is conveyed to that recipient. This insures that only recipients who, based on position, direction and speed will be able to act on the message within its specified lifetime. Potential recipients who are located outside the dynamic circle, and who could not respond to the message within its lifetime, will not receive that message.

Figure 5:
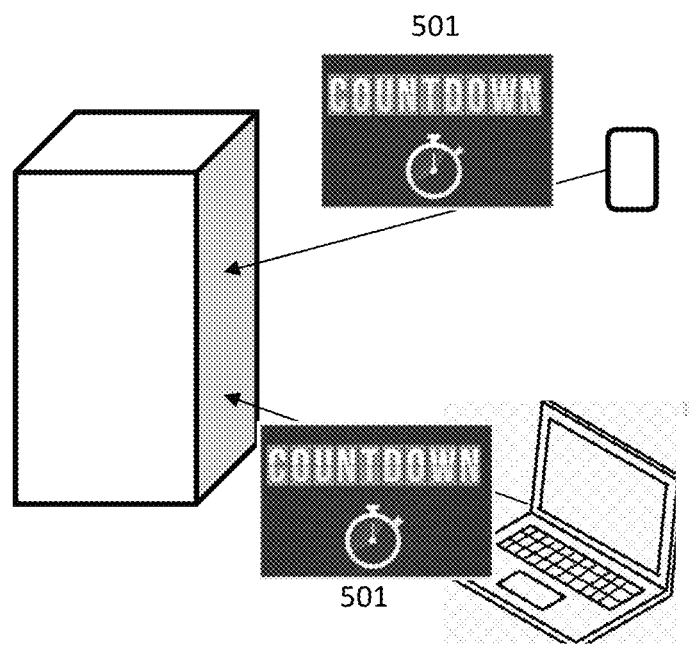
FIG. 5 illustrates a broadcaster using a handheld or other computing device and underlying program or programs features to convey a message lifetime represented by a countdown clock.

In FIG. 5, by using a handheld or computing device, the broadcaster conveys the message lifetime (501) to a cloud server or servers.

Figure 6:
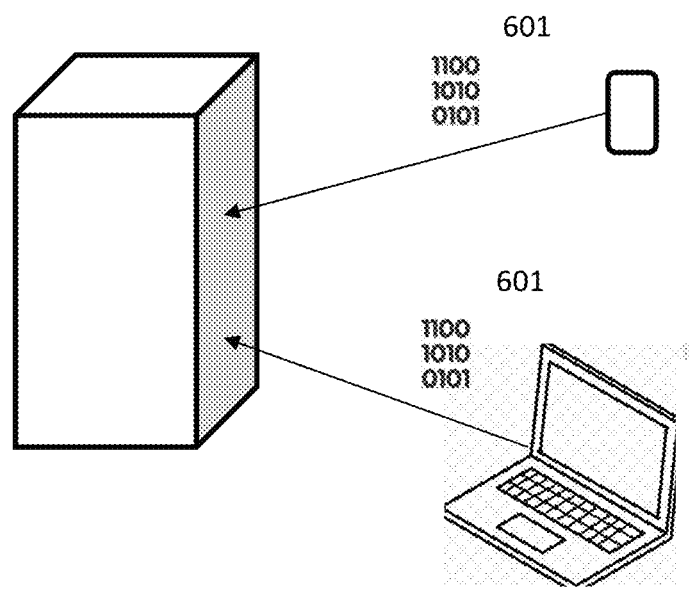
FIG. 6 illustrates a broadcaster, having specified a message lifetime, composes a message or messages, in the form of wirelessly conveyed data packets to be conveyed to recipients in a geo-fence area, established by the server, based on the conveyed message lifetime data.
Figure 7:
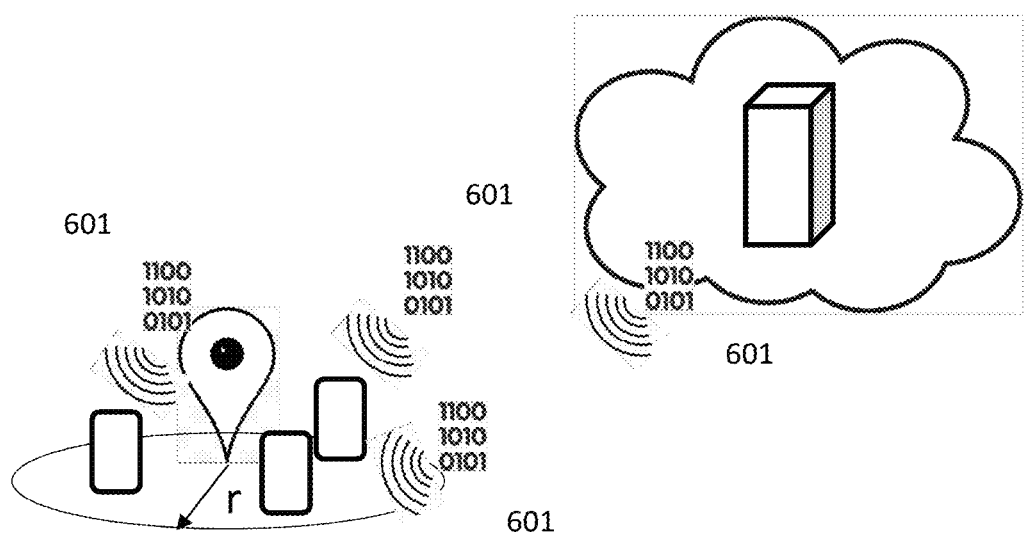
FIG. 7 illustrates how the cloud server subsystem making use of a wireless conveyance infrastructure then broadcasts the message or messages composed by the broadcaster such that recipients located within a geo-fence area, who have opted to receive such messages, will have those messages wirelessly conveyed to them.

The broadcaster, as shown in FIG. 6, can compose one or more messages comprising one or more data packets (601). As shown, these may be composed on a handheld or other computing device.

Once a broadcaster has established a message lifetime, and the invention system establishes a center and dynamic geo-fence area based on message lifetime input, redemption center location, and recipient users' location, direction and speed; the recipients will receive the data packetized messages (601) conveyed wirelessly from one or more cloud servers.

Some use cases may help illustrate how this invention system may be used. If a portion of coast line may experience a tsunami as a result of a submarine earthquake, a public safety authority could issue an alert message with a lifetime associated with it. Recipients in vehicles likely to enter a geo-fence area related to the message would receive a warning about the possibility of a tsunami and be advised to avoid the area. A recipient located far enough away where the message lifetime is likely to have been exceeded would not receive the warning message.

In a commercial use case, a store could compose and convey a coupon-type message having a time limitation associated with it. The recipient's present location, direction and speed would be used to determine whether to dispatch the coupon message to that recipient.

Virtually any scenario whereby targeting specific time-sensitive messages to specific recipients in specific areas makes the messages more effective could make use of this invention system.

The exemplary handhelds and servers make use of standard wireless conveyance infrastructures (e.g. WiFi and cellular). The invention, however, need not rely on standard wireless conveyance and could make use of a proprietary wireless conveyance infrastructure, so long as the hardware subsystems were operative to make use of that infrastructure.

Because the messages are sent as data packets, virtually any kind of message could be conveyed. It could be textual, graphical, sound, video and so on. There are no limitations to what may be conveyed so long as the throughput is sufficient to support it in a practical amount of time.

What is claimed is:

1. A system comprising:
   a first program, residing in a computing device, operative to:
      enable a broadcaster user to specify a message lifetime of predetermined duration;
      enable said broadcaster user to compose a message or messages;
      said message or messages targeted to recipient users whose locations, directions and speeds would permit response within said message lifetime duration;
      convey said message or messages to recipient users physically located within dynamic circular geo-fence areas based on said recipient users' said locations, directions, speeds, and remaining said message lifetime duration; and
   a second program residing in a handheld device operative to:
      enable said recipient users to receive said message or messages; and
      receiving said message or messages only when said handheld device is physically located in said dynamic circular geo-fence area.

2. A method comprising:
   specifying by a broadcaster user a message lifetime of predetermined duration;
   composing said message of predetermined duration;
   directing said message to recipients based on said recipients' location, direction and speed;
   conveying said message to said recipients wherein said recipients' handheld devices are located within a dynamic geo-fence circular area whose area changes with message lifetime duration; and
   receiving by said recipients said message wherein said handheld devices are within said dynamic geo-fence circular area.

* * * * *